(12) United States Patent
Wolf et al.

(10) Patent No.: US 6,761,346 B1
(45) Date of Patent: Jul. 13, 2004

(54) GRIP FOR A PORTABLE HAND-GUIDED WORKING TOOL AND MOLDING SAME

(75) Inventors: Günter Wolf, Oppenweiler (DE); Manfred Thais, Winnenden (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/365,613

(22) Filed: Aug. 2, 1999

Related U.S. Application Data

(63) Continuation-in-part of application No. 08/900,101, filed on Jul. 25, 1997, now abandoned.

(30) Foreign Application Priority Data

Aug. 1, 1996 (DE) .......................................... 196 32 053

(51) Int. Cl.[7] .............................................. B29C 33/44
(52) U.S. Cl. .................................. 249/59; 425/DIG. 58
(58) Field of Search ...................... 249/59; 425/DIG. 58

(56) References Cited

U.S. PATENT DOCUMENTS 4,871,505 A * 10/1989 Lapeyre ................... 264/328.1
6,352,662 B1 * 3/2002 Murphy et al. ............. 264/129

FOREIGN PATENT DOCUMENTS

JP              03187720 A   *  8/1991

* cited by examiner

Primary Examiner—Robert Davis
Assistant Examiner—Donald Heckenberg
(74) Attorney, Agent, or Firm—R W Becker & Associates; R W Becker

(57) ABSTRACT

A mold for a plastic grip of a portable tool has two halves with depressions forming the negative. The base body has a top grip extending, when mounted, across the topside of the housing perpendicularly to a longitudinal axis of the tool and a lateral grip connected to the top grip extending therefrom, when mounted, laterally downwardly. The top grip has a first end and the lateral grip has a second end for connecting to the housing. Top and lateral grips have identical elliptical cross-sections rotated to one another in the circumferential direction of the grip by an angle of rotation. Cross-sections have a first diameter larger than a second diameter. Mold depressions have recesses for molding elongate, raised portions in the longitudinal direction. Recesses are adjacent circumferentially and extend spirally. Separation surfaces of mold halves are positioned in a longitudinal center plane of a recess adjacent the first diameter.

15 Claims, 14 Drawing Sheets

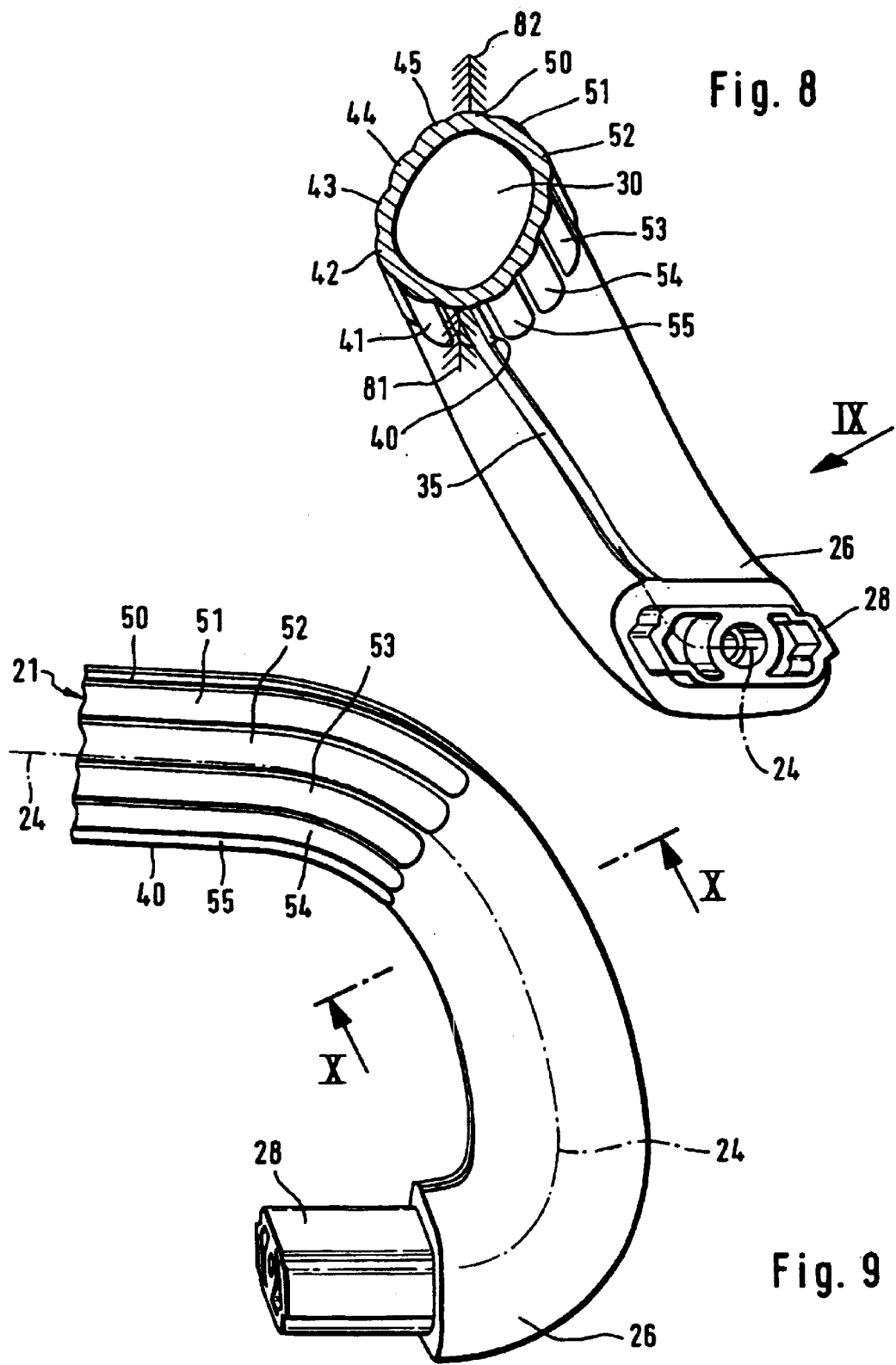

A4-A4

B4-B4

A5-A5

B5-B5

GRIP FOR A PORTABLE HAND-GUIDED WORKING TOOL AND MOLDING SAME

This application is a Continuation-In-Part of application Ser. No. 08/900,101 of Jul. 25, 1997, now abandoned.

BACKGROUND OF THE INVENTION

The present invention relates to a grip for a portable, hand-guided working tool, especially a motor chainsaw, hedge clippers, a trimmer or cutoff device etc. with a base body molded in a two-part mold from a plastic material. The grip is positioned transversely to a longitudinal direction of the working tool at a distance above the housing. It has a top grip portion and a lateral grip portion connected thereto that extends laterally at a sidewall of the housing. The two ends of the base body are provided with connecting portions for securing the grip at the working tool. The grip portions have a substantially identical elliptical cross-section with a large and a small diameter. The cross-section of the top grip portion is positioned rotated in the circumferential direction of the base body relative to the cross-section. of the lateral grip portion so that the large cross-sectional diameter of the lateral grip portion is positioned in a different plane than the diameter of the cross-section of the top grip portion.

Such a grip is known from U.S. Pat. No. 5,245,757. It is comprised of a hollow base body with an elliptical cross-sectional shape which has a greater and a smaller cross-sectional diameter. In order to provide optimized gripping conditions for the user, the position of the cross-section is rotated along the length of the grip. Accordingly, the greater cross-sectional diameter of the lateral grip portion is positioned substantially perpendicularly to the plane which is defined by the guide rail of the motor chainsaw, while the cross-section of the upper grip portion is rotated relative to the cross-section of the lateral grip portion such that the greater cross-sectional diameter is positioned at an acute angle to the top side of the working tool. Such grips are produced in a two-part mold from plastic material and have been successfully used in practice. For providing sufficient grip, the mantle surface of the grip is roughened.

From U.S. Pat. No. 4,964,217 it is known to provide a plastic grip with an outer fluting in order to increase grip for the user. The fluting, however, can be embodied only relatively shallow because the grip otherwise could not be removed from the mold.

From German Gebrauchsmuster 94 11 866 a grip consisting of a profiled aluminum tube is known whereby the deep fluting insures good grip without negatively affecting comfort for the user.

It is therefore an object of the present invention to improve a grip of the aforementioned kind such that, while allowing easy removal from the two-part mold, a pronounced fluting is provided for increasing grip.

SUMMARY OF THE INVENTION

The inventive grip for a portable, hand-guided working tool according to the present invention is primarily characterized by:

a plastic base body molded in a two-part mold:
the base body comprising a top grip portion extending, when the grip is mounted on the working tool, across the top side of the housing of the working tool perpendicularly to a longitudinal axis of the working tool at a spacing to the top side of the housing so as to allow a user to grip the top grip portion;
the base body comprising a lateral grip portion connected to the top grip portion and extending from the top grip portion, when the grip is mounted on the working tool, laterally downwardly at a spacing to a sidewall of the housing so as to allow a user to grip the lateral grip portion;
the top grip portion having a first connecting end for connecting the grip to the housing;
the lateral grip portion having a second connecting end for connecting the grip to the housing;
the top grip portion having a first elliptical cross-section and the lateral portion having a second elliptical cross-section, wherein the first and second cross-sections are identical;
the cross-sections having a first and second diameter, the first diameter being larger than second diameter;
the first cross-section rotated relative to the second cross-section in a circumferential direction of the grip by an angle of rotation;
the base body having integral, elongate, raised portions, extending in a longitudinal direction of the grip and positioned adjacent to one another in the circumferential direction of the grip;
the raised portions extending slightly spirally along the top grip portion and the lateral grip portion;
wherein the two-part mold has mold seams, resulting from molding in the two-part mold, positioned within a longitudinal center plane of a respective one of the raised portions neighboring the first diameter.

Advantageously, the raised portions have a first end at the lateral grip portion and a second end at the top grip portion. The angular distance between the first and second ends measured in the circumferential direction of the grip is identical to the aforementioned angle of rotation.

The raised portions have a rounded outer contour in the circumferential direction of the grip.

The raised portions have different radii of curvature.

The raised portions neighboring the first diameter have a smaller radius than the raised portions neighboring the second diameter.

The raised portions in the circumferential direction are spaced at a small distance from one another.

The raised portions have different angular distances in the circumferential direction.

The angular distance is preferably 24° to 34°.

The raised portions neighboring the first diameter have a smaller angular distance than the raised portions neighboring the second diameter.

Advantageously, the respective raised portion neighboring the first diameter has a flattened part extending over the length of the respective raised portion.

The flattened part preferably extends to the end face of the first connecting end and to the end face of the second connecting end.

The flattened part is preferably positioned centrally relative to the respective raised portion.

Advantageously, the mold seam extends perpendicularly to the flattened part. The mold seams preferably extend in parallel planes.

Relative to the mounted position of the grip, one of the mold seams faces the working tool and another mold seam faces away from the working tool.

The base body is hollow and has a uniform minimum wall thickness in the circumferential direction.

The rotational change of the first cross-section into the second cross-section is uniform in the longitudinal direction of the grip.

Since the raised portions, that provide the profiling or fluting of the grip and extend in the longitudinal direction of the grip, are simultaneously being rotated over the length of the grip in a spiral, it is possible to position the mold seams of the mold, despite the rotating cross-section in the longitudinal direction, at the highest point of the cross-section. Thus, the mold seams of the mold (parting line of the mold) extend also in the form of a spiral in the longitudinal direction of the grip whereby the grip halves defined by the parting line or separation surfaces of the mold are free of an undercut. By separating the mold such that it has two slightly spirally extending mold joints or separation surfaces, an easy removal of the grip, despite the pronounced fluting of the elliptical grip with a cross-section that is rotated in the longitudinal direction of the grip, is possible. Preferably, the angular distance of the beginning point of a raised portion to the end point of a raised portion corresponds substantially to the rotational angle of the cross-section within the respective grip portions. Such an embodiment has been proven to be successful with respect to easy removal from the mold.

For increasing the comfort of the user, the raised portions have a rounded outer contour in the circumferential direction whereby the raised portions, depending on their position about the periphery, have different radii of curvature. Depending on their position about the periphery, the angular distances of the raised portions are also different in the circumferential direction in order to provide a comfortable grip fluting with good grip in any grip position.

Preferably, the projection or raised portion that is positioned in the parting plane of the mold is provided over its length with a narrow flattened part so that in the area of the mold joint the mold and the base body extend at a right angle to one another.

BRIEF DESCRIPTION OF THE DRAWINGS

The object and advantages of the present invention will appear more clearly from the following specification in conjunction with the accompanying drawings, in which:

FIG. 8 is a section along the line VIII—VIII of FIG. 7;

FIG. 9 is a view onto a connecting portion of the grip according to arrow VIII in FIG. 8;

DESCRIPTION OF PREFERRED EMBODIMENTS

The present invention will now be described in detail with the aid of several specific embodiments utilizing FIGS. 1–20B.

Figure 1:
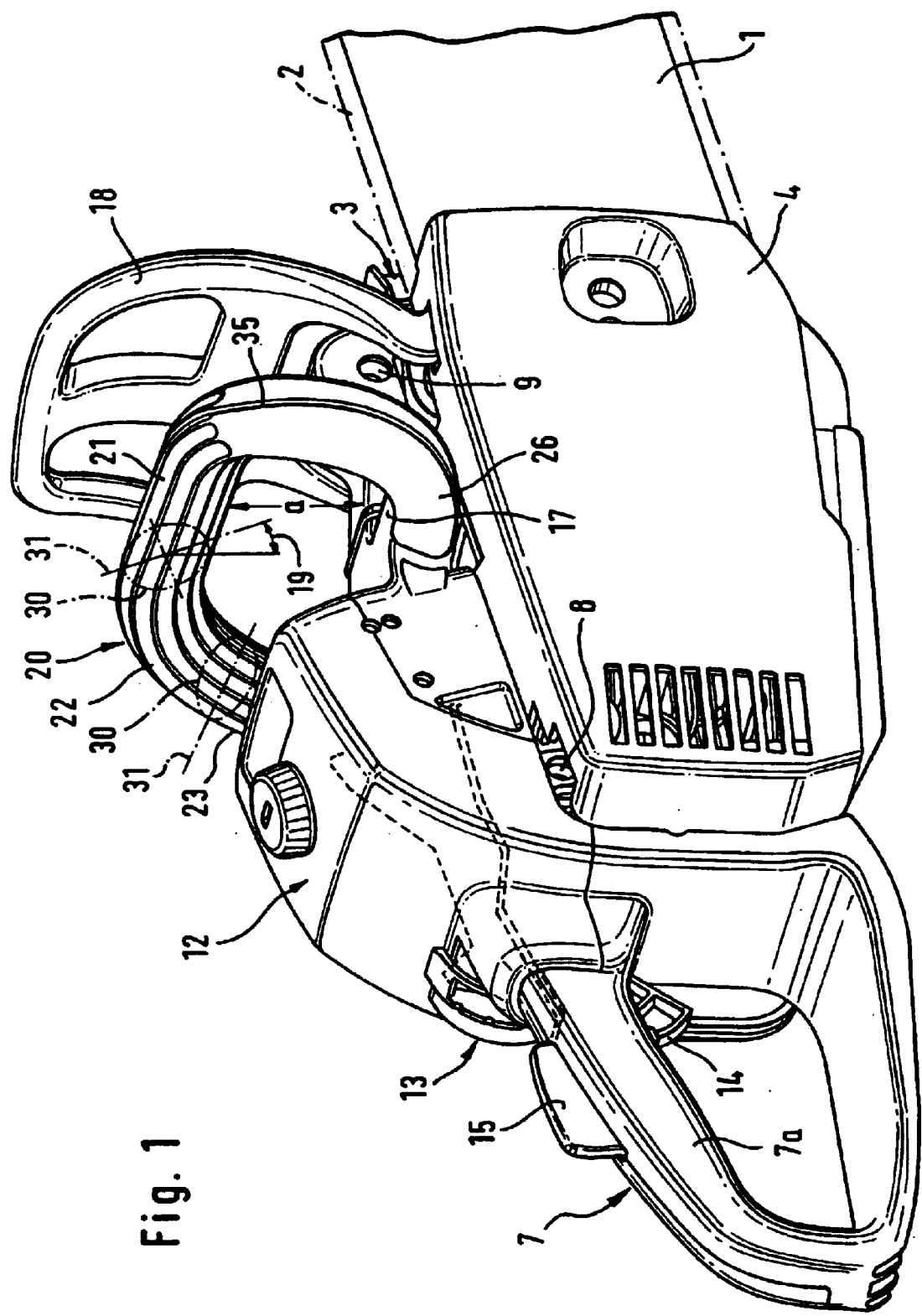
FIG. 1 is a perspective view of a portable, hand-guided working tool with an inventive grip.
Figure 2:
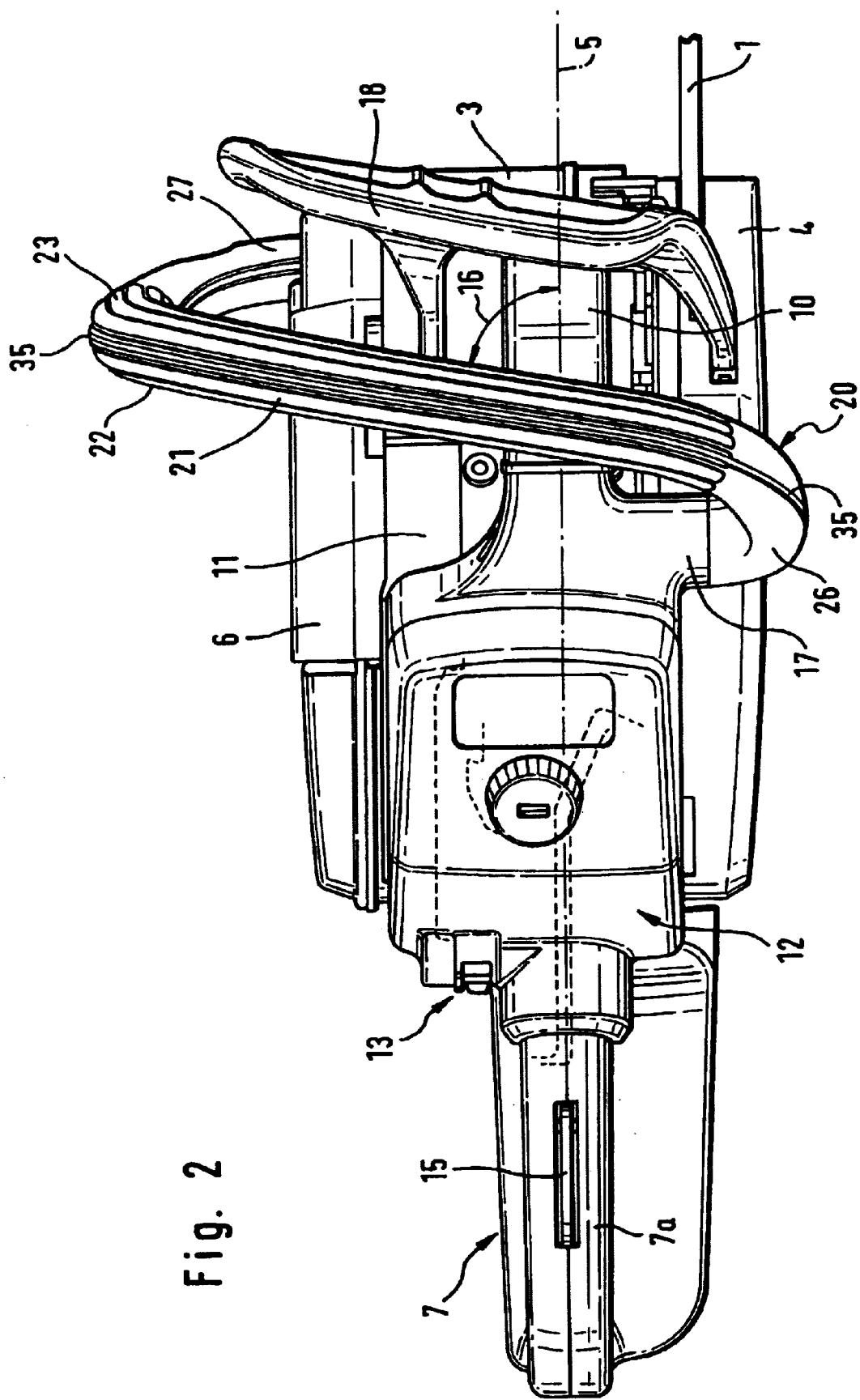
FIG. 2 is a plan view onto the working tool of FIG. 1.
Figure 4:
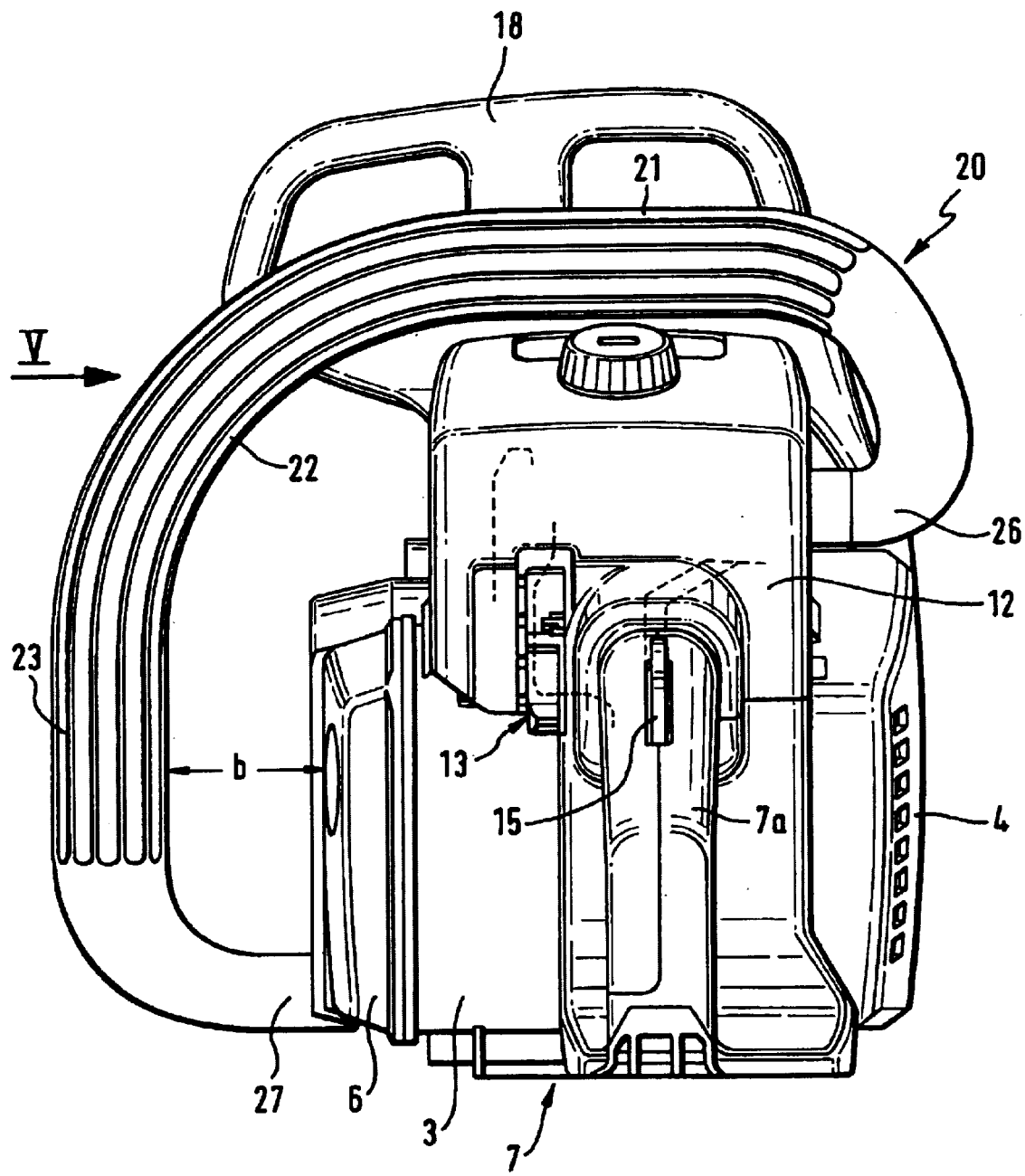
FIG. 4 is a rear view of the working tool from the rear.
Figure 5:
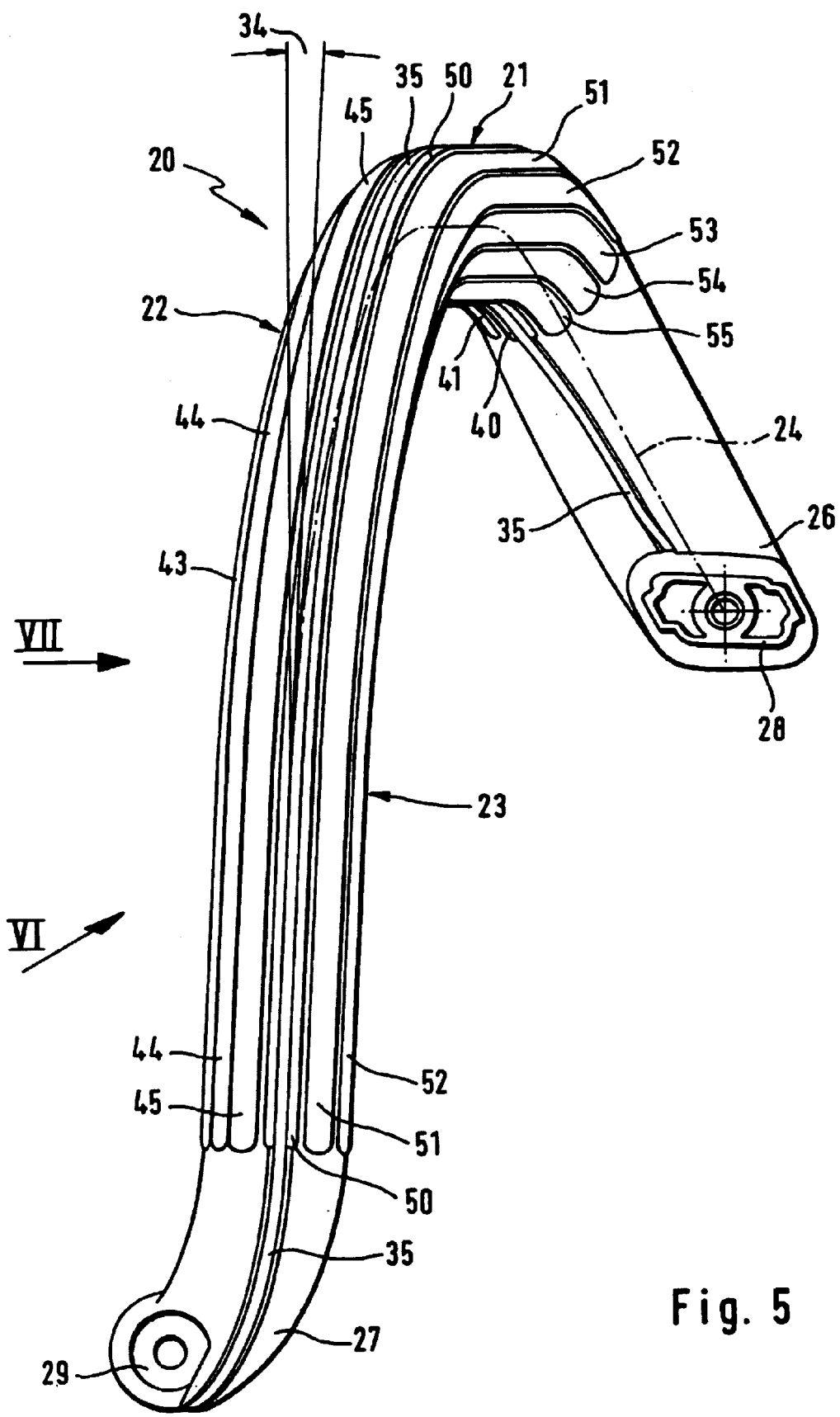
FIG. 5 is a side view onto the grip according to arrow V of FIG. 4.

The portable, hand-held working tool represented in FIGS. 1, 2, and 4 is a motor chainsaw with a saw chain 2 circulating about the guide rail 1. The guide rail 1 is clamped between the motor housing 3 and the cover 4 for the chain wheel, and extends substantially in the longitudinal direction 5 perpendicularly to the front end of the housing. The chain wheel cover 4 covers a chain wheel driven by a drive motor arranged within the motor housing 3 and driving the saw chain 2. The drive motor can be an electric motor or an internal combustion engine. Preferably, it is a single cylinder, two-stroke engine.

At the housing side opposite the chain wheel cover 4, the housing 3 is provided with a blower cover 6 of a cooling blower which provides the cooling airstream for cooling the internal combustion engine.

The backside of the motor housing 3 is provided with a rear grip 7 which is secured at the motor housing 3 by anti-vibration elements 8 and 9. For this purpose, the rear grip 7 is provided with a fastening arm 10 at a portion adjacent to the actuating portion 7a which, in the longitudinal direction 5, extends across the top side 11 of the housing and is secured by anti-vibration elements 8 and 9. The fastening arm 10 is embodied, in the connecting area to the actuating portion 7a of the rear grip 7, as a carburetor housing 12 in which an air filter as well as a carburetor for supplying the fuel/air mixture to the internal combustion engine are arranged. In the area of the actuating portion 7a operating elements 13 of the carburetor are arranged in the wall of the carburetor housing 12. A throttle lever 14 as well as a throttle lever lock 15 are provided at the actuating portion 7a.

For carrying and guiding the working tool, which may be in the form of hedge clippers, a cutoff device etc., a grip 20 is arranged at the forward area of the housing 3. This grip 20 is comprised of a top grip portion 21 extending transverse to the longitudinal direction 5 of the housing which, see FIG. 1, spans at a distance a the top side 11 of the motor housing 3. In the shown embodiment, the top grip portion 21 is positioned at an angle 16 of approximately 80° relative to the longitudinal axis 5. Connected to the top grip portion 21 is a curved connecting portion 22 bent by approximately 90° which is connected to a lateral grip portion 23 extending substantially vertically and at a lateral distance spaced from the motor housing, respectively, the blower cover 6. At the free ends of the plastic base body 25 connecting portions 26, 27 are provided with which the plastic grip 20 is connected to the working tool. The plastic material of the grip is preferably Durethan (trademark).

Figure 6:
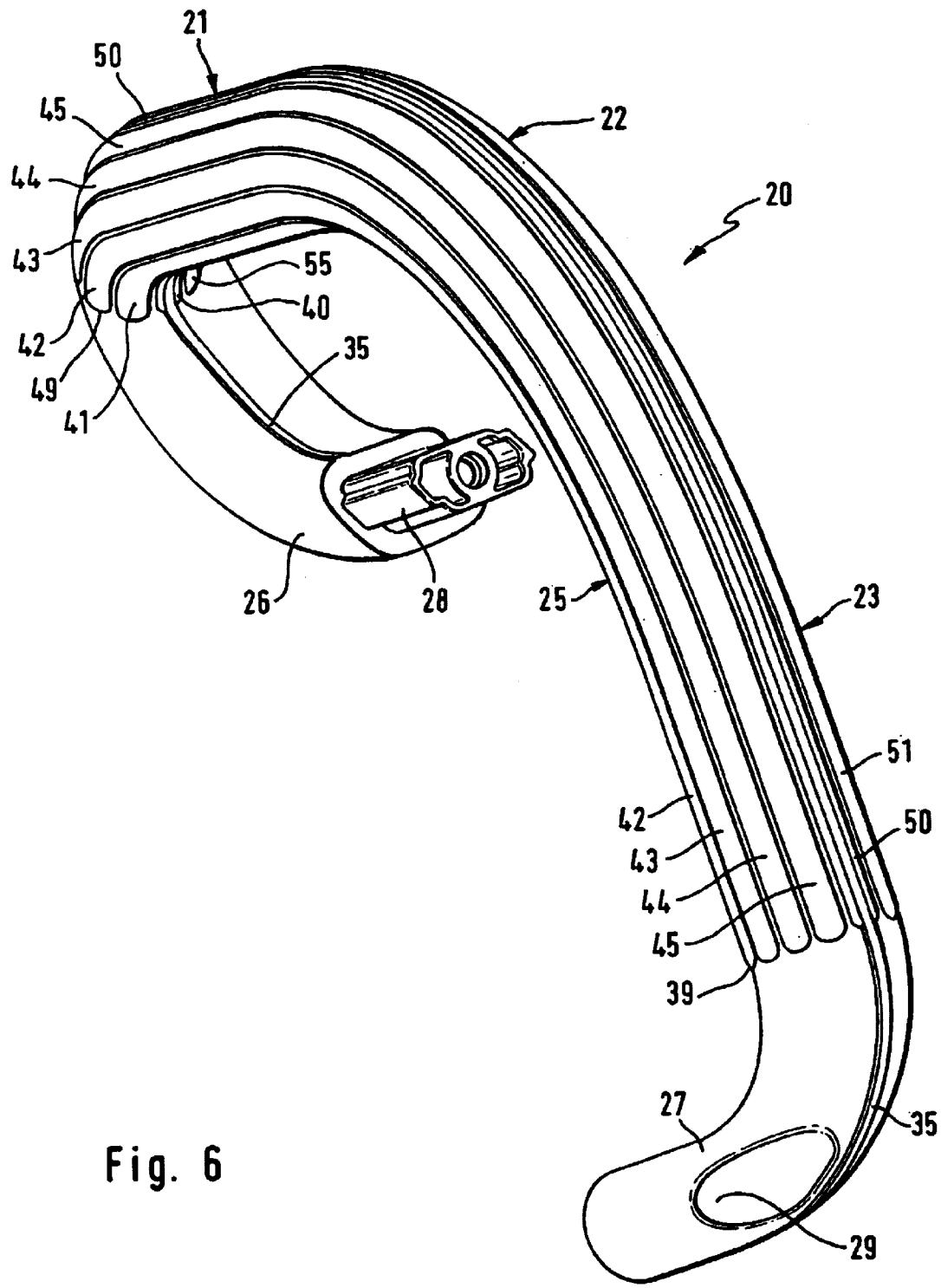
FIG. 6 is a perspective representation of the grip according to FIG. 5 in the direction of arrow VI.
Figure 7:
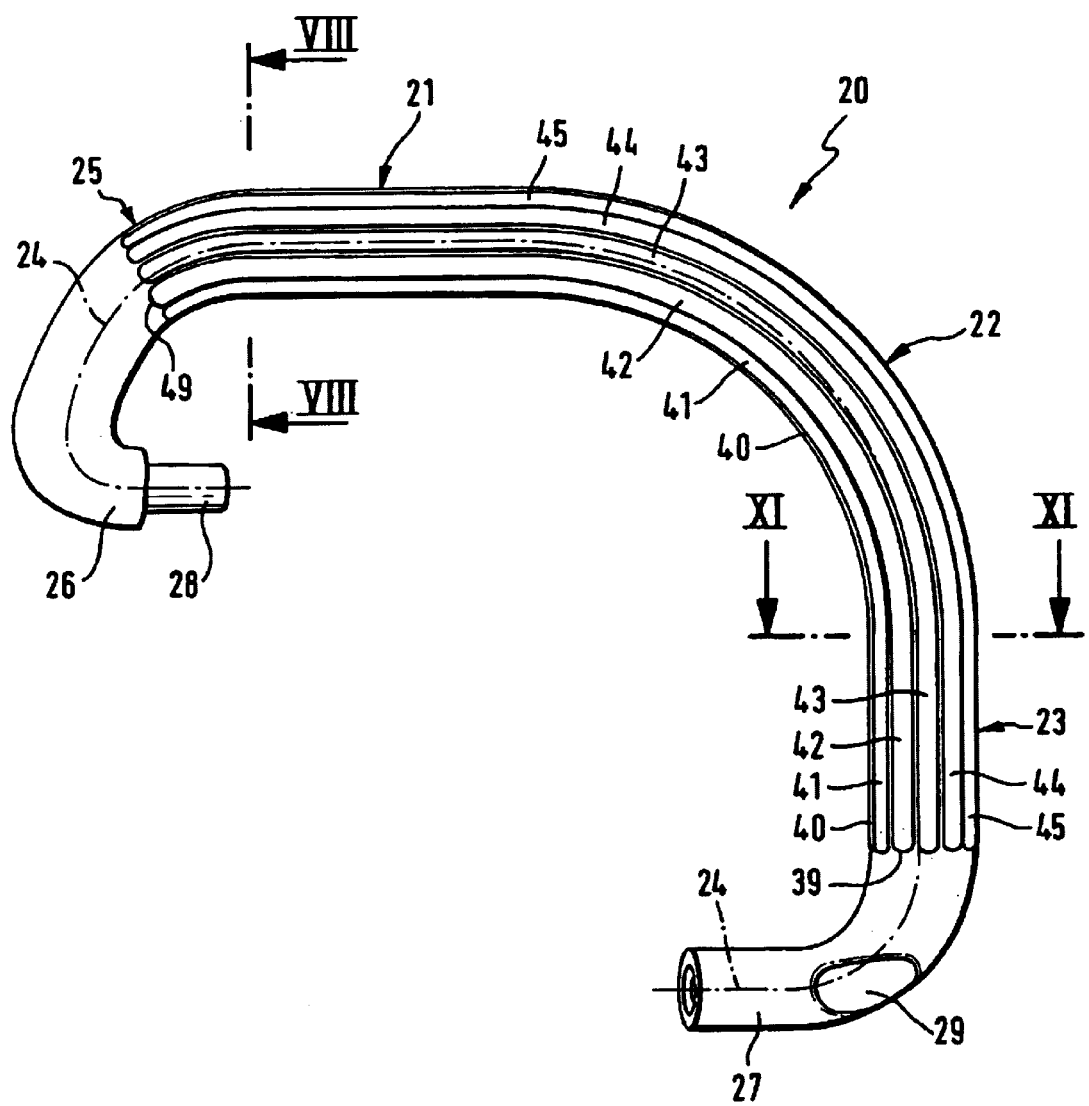
FIG. 7 is a front view onto the grip according to FIG. 5 in the direction of arrow VII.

The connecting portion 26 connected to the free end of the top grip portion 21, as is shown is FIGS. 6 and 7, is substantially U-shaped and engages with a plug 28 a connecting member 17 of the fastening arm 10 of the rear grip 7. The connecting member 17 extends approximately at a right angle to the longitudinal axis 5 of the device at the side of the fastening arm 10 facing the chain wheel cover 4.

The connecting portion 27 provided at the grip portion 23 is approximately shaped as a 90° bend and is fastened in the area of the front end of the housing in the vicinity of the motor housing bottom at the longitudinal side of the housing, preferably by a screw connection. For this purpose, a receiving opening 29 is provided within the connecting portion 27 in order to receive a fastening screw.

Figure 3:
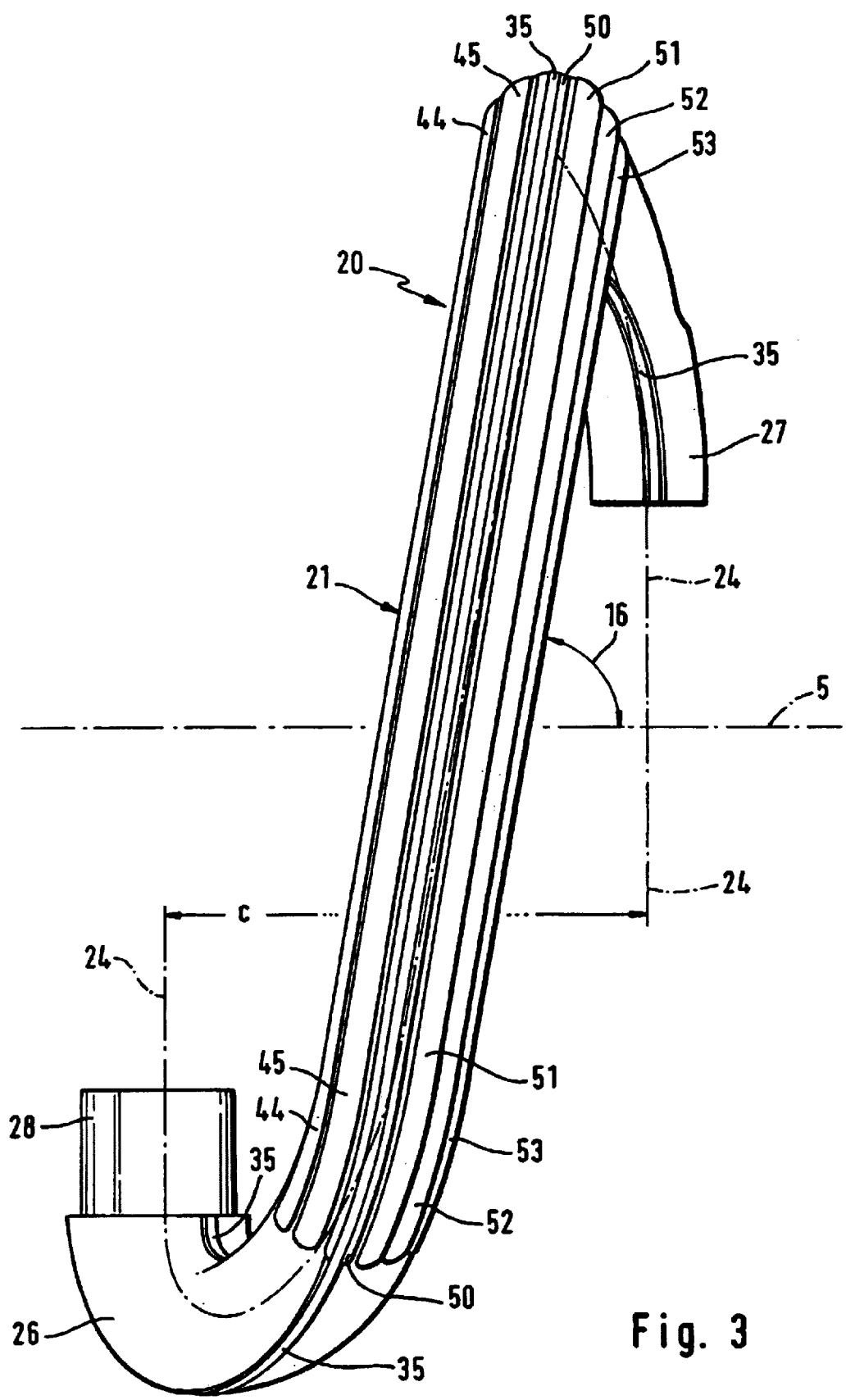
FIG. 3 shows in an enlarged representation a plan view onto the grip according to FIG. 2.

As can be seen especially in FIGS. 2 and 3, the connecting portions 26 and 27, in a plan view, are positioned at a distance c to one another, whereby the connecting portion 27 of the lateral grip portion 23 is closer to the forward end of the housing than the connecting portion 26 of the top grip portion 21, which is secured in the vicinity of the carburetor housing 12 at the fastening arm 10.

A hand guard 18 is positioned adjacent to the top grip portion 21 and is secured in a pivotable manner at the motor housing 3. It actuates a safety braking device arranged at the chain wheel cover 4 when the operator of the device slips from the grip 20 and hits the hand guard 18.

As schematically shown in FIG. 1 and FIGS. 8, 10, and 11 in cross-section, the base body 25 is hollow and has a wall thickness d which in the circumferential direction is preferably uniform. Especially the cross-section of the grip portions 21, 22, and 23 has a non-circular cross-sectional contour, i.e., an elliptical cross-section with a greater diameter 31 and a smaller diameter 32. The greater (first) diameter 31 is comparable to the larger axis of an ellipsoid. The smaller (second) cross-sectional diameter 32 corresponds to the smaller axis. The longitudinal grip axis 24 divides the smaller cross-sectional diameter 32 symmetrically. The greater cross-sectional diameter 31 is divided into a larger section 31a and a smaller section 31b. The smaller section 31b in the mounted state of the grip preferably faces the working tool.

As can be seen in the representation of FIG. 1, the cross-section 30 of the lateral grip portion 23 is positioned in a different rotational position relative to the longitudinal axis 24 of the grip (FIG. 5) than the cross-section 30 of the top grip portion 21. As shown in FIG. 1, the cross-section 30 of the top grip portion 21 is rotated counter-clockwise relative to the cross-section 30 of the lateral grip portion 23 by an angle 19 in the circumferential direction such that the larger cross-sectional diameter 31 of the lateral grip portion 23 is positioned in a different plane than the greater cross-sectional diameter 31 of the cross-section 30 of the top grip portion 21. The cross-sectional diameter 31 of the cross-section 30 of the lateral grip portion 23 extends substantially perpendicularly to the longitudinal side of the housing 3. The longitudinal side extends parallel to the plane of the guide rail 1. The larger cross-sectional diameter 31 of the cross-section 30 of the top grip portion 21 is positioned at an angle 19 to the plane defined by the top side 11 of the housing. The transition from the cross-sectional position of the cross-section 30 within the lateral grip portion 23 to the rotated cross-sectional position of the cross-section 30 within the top grip portion 2 is preferably uniform (continuous), especially over the length of the connecting portion 22.

Figure 11:
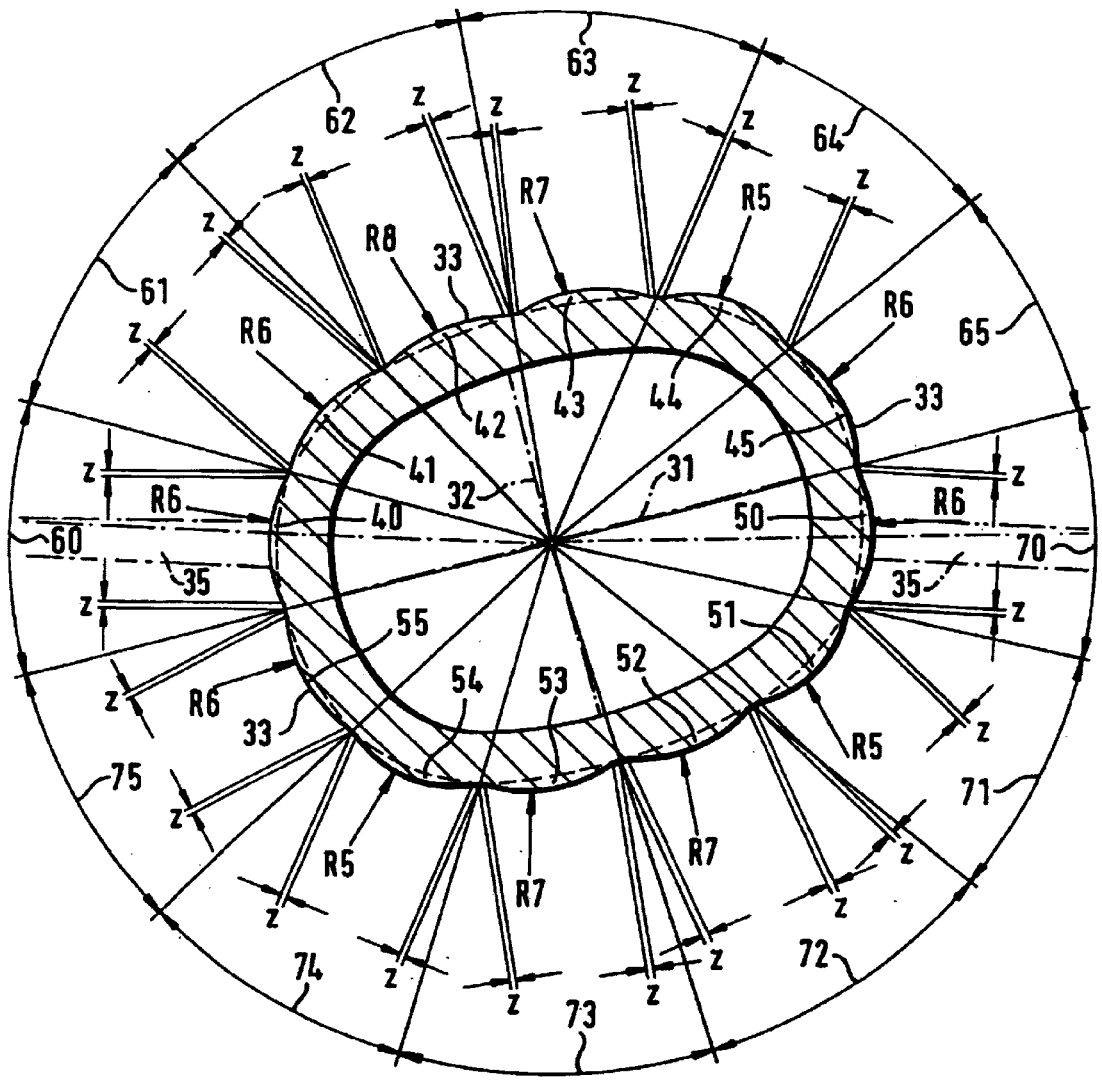
FIG. 11 is a Section along the line XI—XI of FIG. 7.

The grip portions 21 and 23 of the grip 20 have a fluting as shown in the Figures. The fluting is a unitary part of the base body 25 of the grip whereby preferably the connecting portions 26 and 27 are also a unitary part thereof. The profiling or fluting is comprised of a plurality of raised portions 40 to 45, 50 to 55 positioned in the circumferential direction adjacent to one another and extending in the longitudinal direction 24 of the grip. Each raised portion extends somewhat spirally along the grip portions 21 and 23 as well as the connecting portion 22. The angular distance of a starting point 39 of the raised portion 42 to an end point 49 in the circumferential direction corresponds substantially to the rotational angle 19 between the cross-sections 30 of the top grip portion 21 and the lateral grip portion 23 (FIG. 6). The raised portions 40 to 45 and 50 to 55 extend at an angle 34 of approximately 3° transversely to the longitudinal direction 24. As shown in FIGS. 8 and 11, each raised portion 40 to 45; 50 to 55 has a rounded outer contour 33 in the circumferential direction whereby the outer contour 33 of the raised portions 40 to 45, 50 to 55 have different radii of curvature R5, R6, R7, R8. It is advantageous to provide the raised portions 40, 45, 50, 55 neighboring the cross-sectional diameter 31 with a radius of curvature R6 that is smaller than the radius of curvature for the raised portions 42, 43, 52, 53 neighboring the smaller cross-sectional diameter 32.

Neighboring raised portions in the circumferential direction of the base body 25 have a minimal distance z or 2z (FIG. 11) relative to one another. The distances z are preferably of the same size. The angular width (angular distances 60 to 65 and 70 to 75) of the raised portions 40 to 45, 50 to 55 measured in the circumferential direction is different. The raised portions 40, 45, 50, 55 neighboring the larger cross-sectional diameter 31 have a smaller angular distance than the raised, portions 42, 43, 52, 53 neighboring the cross-sectional diameter 32.

The angular distances are within a range of 24° to 34°.

The periphery of the cross-section 30 of the shown embodiment is divided into 12 sections (angular distances 60 to 65 and 70 to 75), whereby the angular distances 60 to 65 and the angular distances 70 to 75 when added result in an angle of 180°, respectively. As shown in FIG. 8, one of the raised portions of the angular distances 60 to 65 and 70 to 75 of the group that defines respectively the angular sum of 180° is provided with a flattened part 35 which is embodied as a narrow band at the upper side of the projections 40, respectively, 50. The flattened part 35 extends over the entire length of the raised portion 40, 50. In the shown embodiment, the flattened part 35 extends also along the contour of the connecting portions 26, 27 (FIG. 8). The flattened part 35 is positioned substantially centrally on the raised portion 40, 50 and provides the highest level of the respective raised portion.

Figure 10:
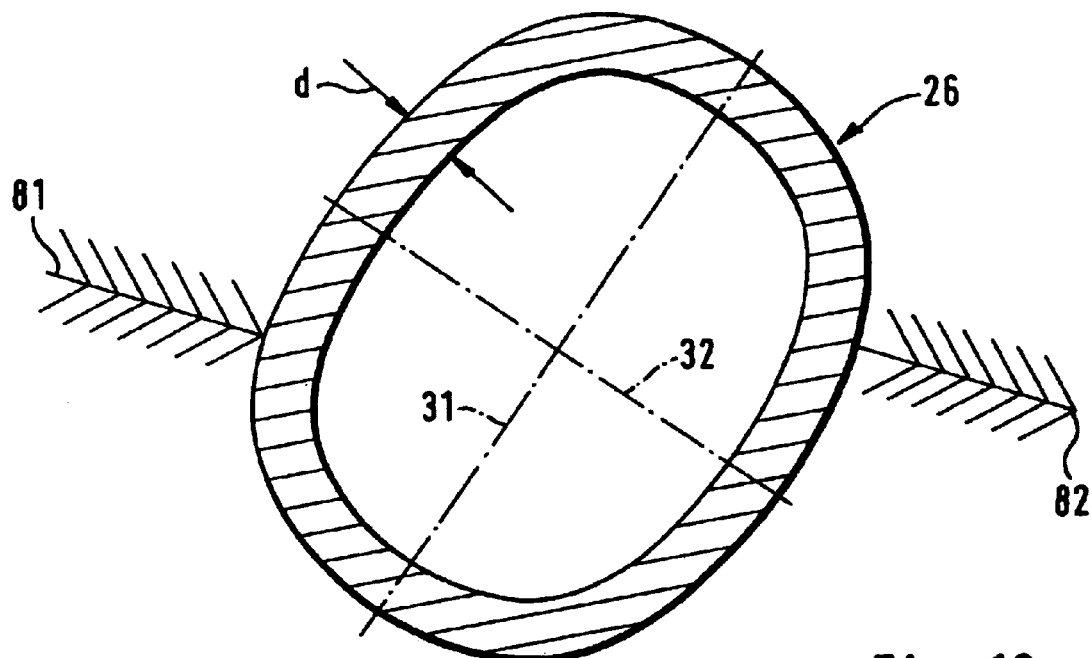
FIG. 10 is a section along the line X—X of FIG. 9.
Figure 12:
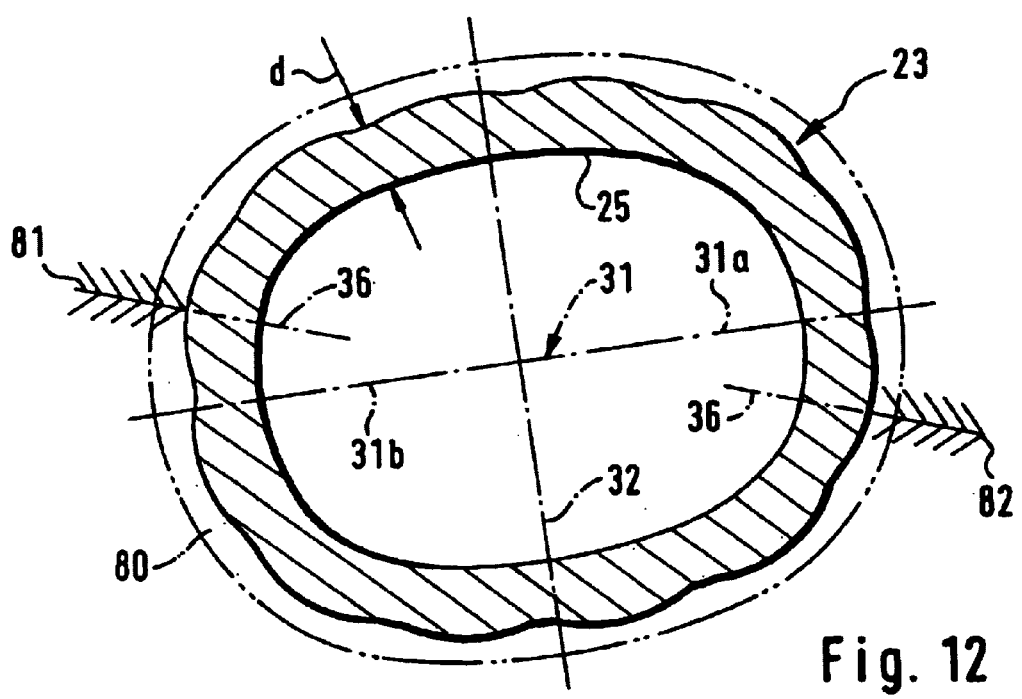
FIG. 12 is a schematic representation of the cross-section according to FIG. 11 in a manufacturing mold

As represented in FIGS. 8, 10 and 12, at the level of the flattened part 35 the mold seams 81, 82 of the manufacturing mold 80 for the grip 20 are provided. The mold joints of the mold 80 preferably extend perpendicularly to the flattened portion 35 over the entire length of the grip 20 approximately within the longitudinal center plane 36 of the raised portions 40, 50. The dividing plane (81, 82). of the mold 80 extends along the corresponding raised portions 40, 50 over the entire length of the grip 20 in its longitudinal direction 24 in a slight spiral. By selecting the location of the mold joints or mold separation surfaces as disclosed, a simple removal from the manufacturing mold 80 is possible despite the pronounced fluting of the grip sections 21, 23 as well as of the connecting sections 22. The selected shape of the cross-section 30, the selected shape of the projections 40 to 45 and 50 to 55 as well their selected width and position ensure proper opening and closing of the mold 80 comprised of two mold halves 83, 84 (see FIG. 13) for producing the grip 20. The mold seam 81 faces the working tool, while the mold seam 82 faces away from the working tool. The mold seams 81 and 82 are positioned at a distance parallel to one another. They do not provide a plane of symmetry of the cross-section 30.

Figure 13:
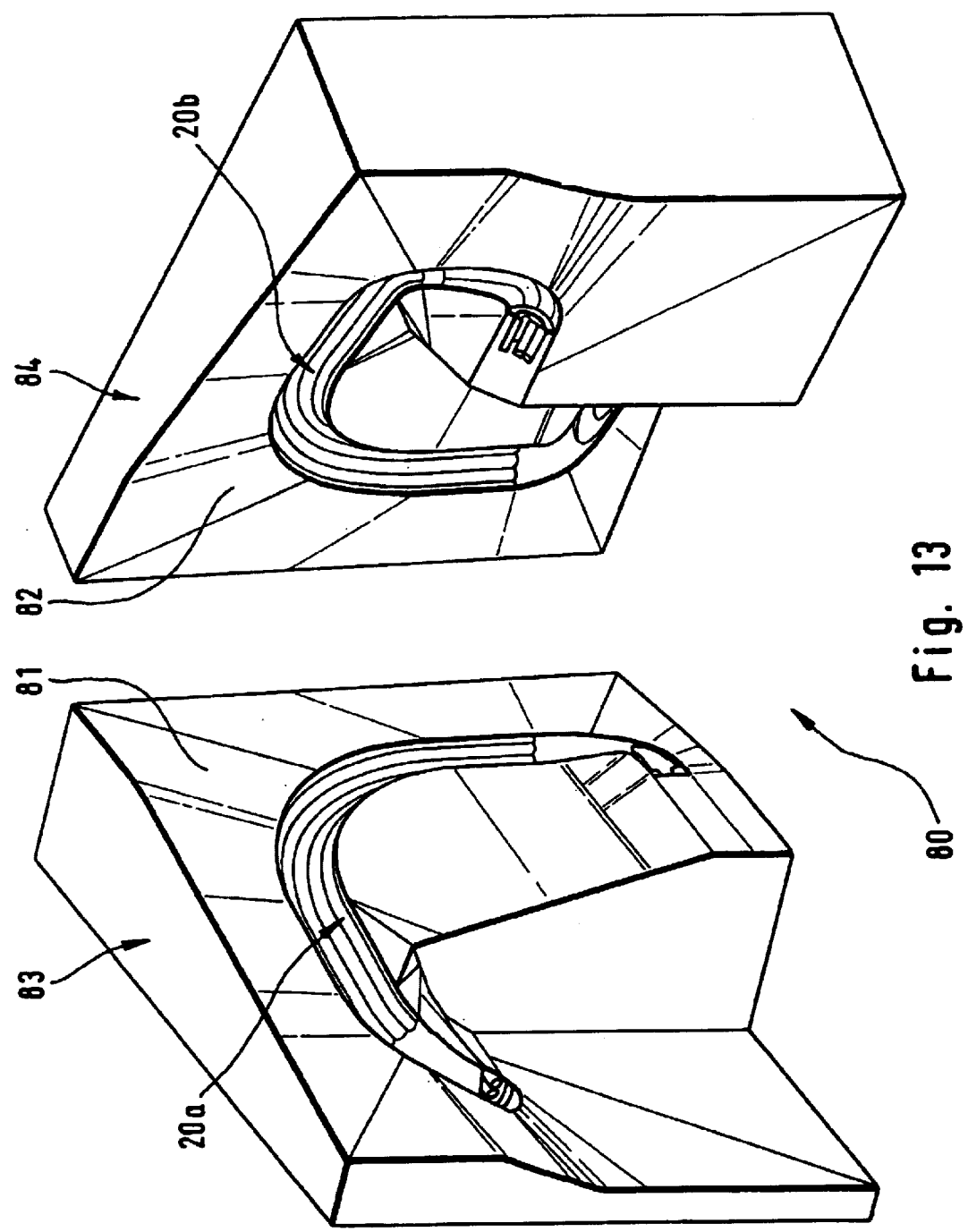
FIG. 13 is a perspective view of the open mold showing the two mold halves.

The mold 80 for manufacturing the grip 20 is shown in a perspective view in FIG. 13 in the open state. It is comprised of two halves 83 and 84 having facing separation surfaces 83', 84' that produce the mold seams 81 and 82 at the grip 20 and define separating lines of the grip 20. The mold halves 83, 84 each have a depression 20a, 20b which combined define the negative for the grip 20 to be formed.

Since the grip 20 has raised portions 40–45 and 50–55 (see FIG. 11) in its longitudinal direction which in the longitudinal direction extend spirally, the location of the parting plane or separation surfaces 83', 84' of the mold 80 is of utmost importance for the removal of the grip 20 from the mold 80.

Figure 14:
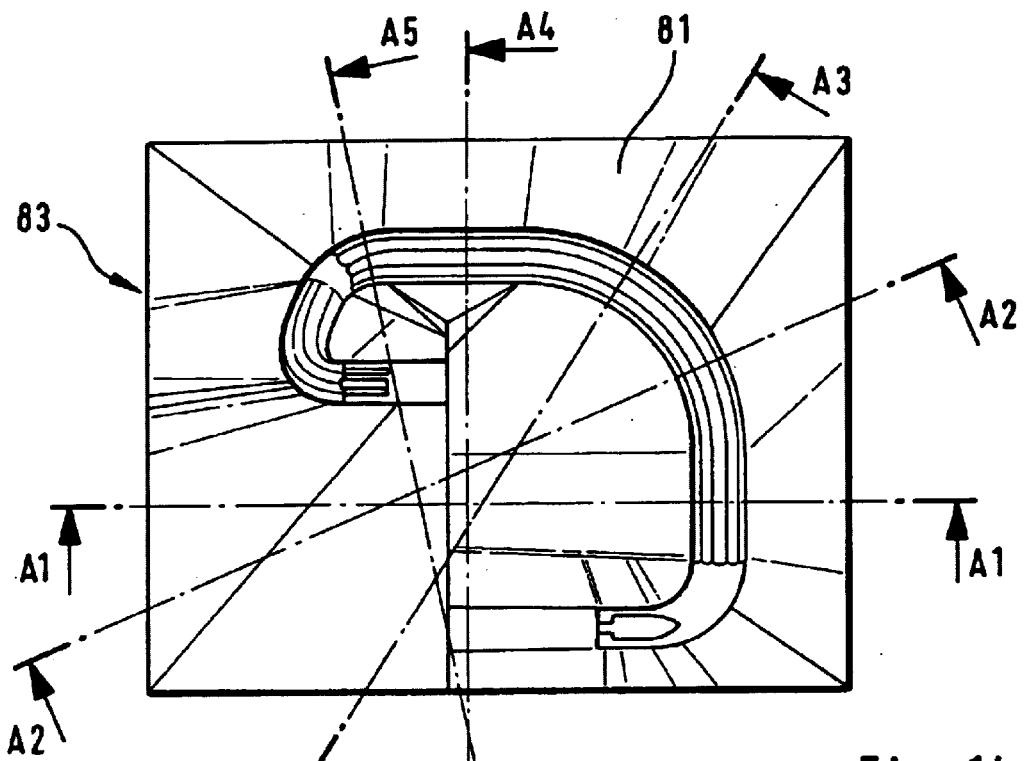
FIG. 14 is a plan view of a first mold half.
Figure 15:
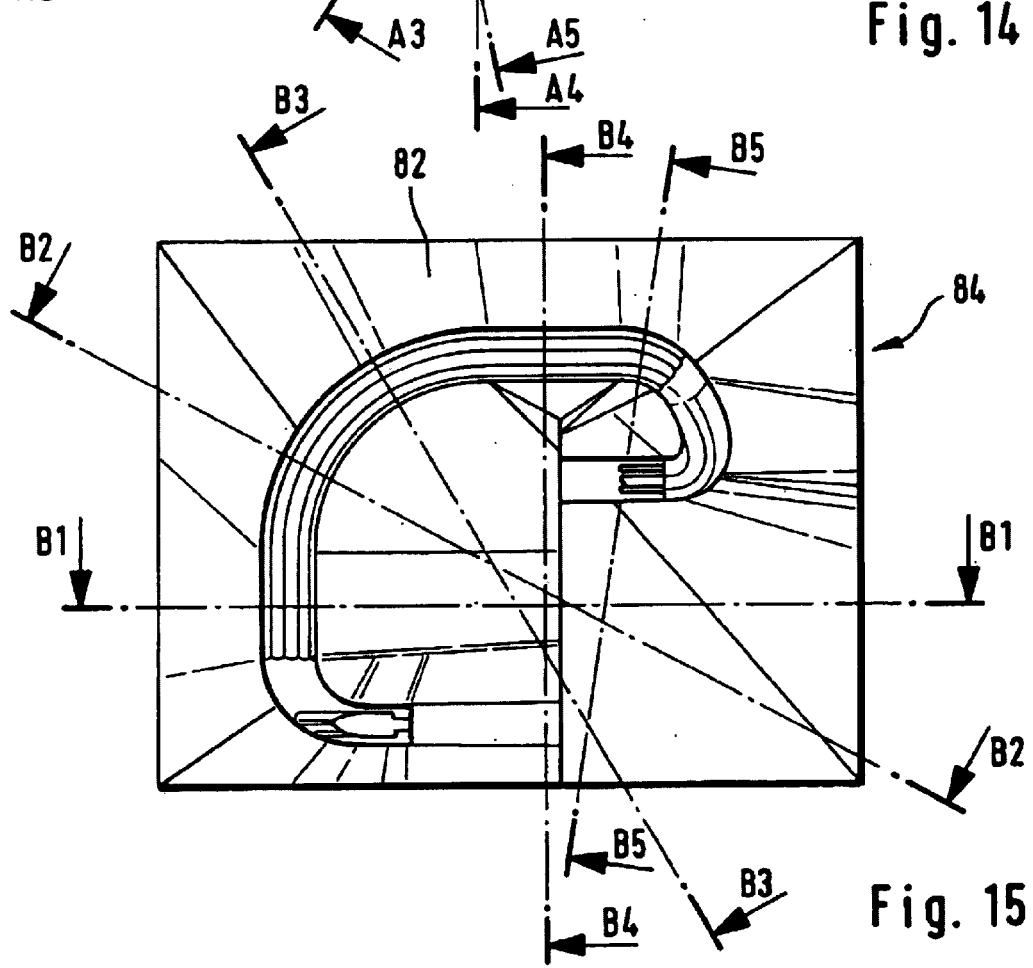
FIG. 15 is a plan view of a second mold half.
Figure 16A:
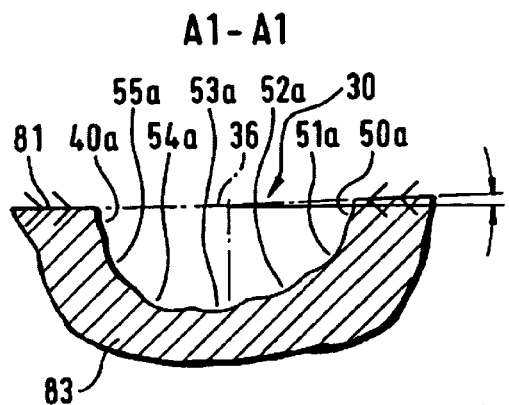
FIG. 16A is a section along the line XVIA—XVIA of FIG. 14.
Figure 16B:
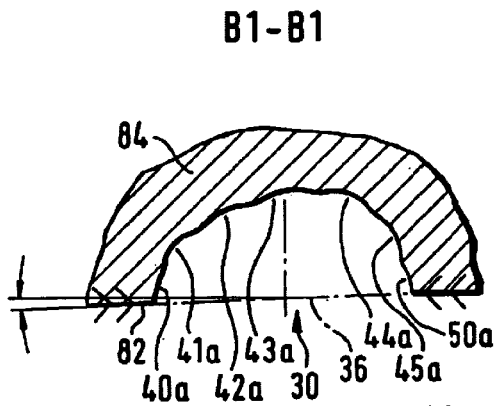
FIG. 16B is a section along the line XVIB—XVIB of FIG. 15.
Figure 17A:
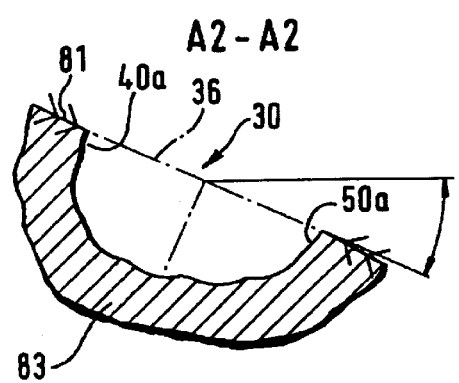
FIG. 17A is a section along the line XVIIA—XVIIA of FIG. 14.
Figure 17B:
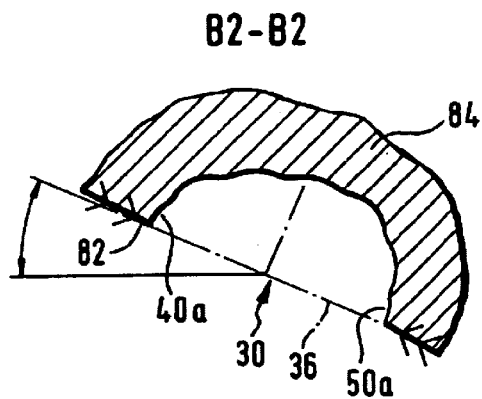
FIG. 17B is a section along the line XVIIB—XVIIB of FIG. 15.
Figure 18A:
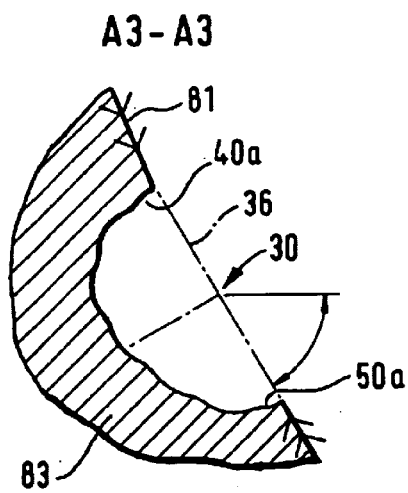
FIG. 18A is a section along the line XVIIIA—XVIIIA of FIG. 14.
Figure 18B:
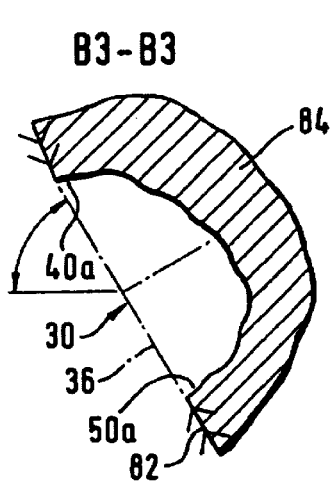
FIG. 18B is a section along the line XVIIIB—XVIIIB of FIG. 15.
Figure 19A:
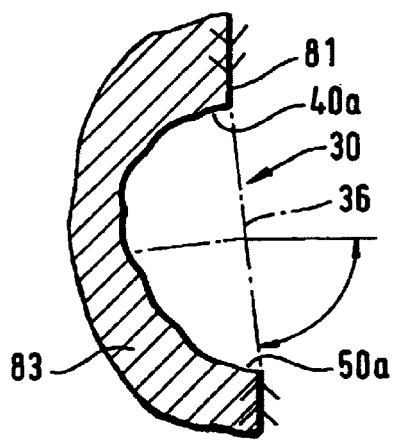
FIG. 19A is a section along the line XIXA—XIXA of FIG. 14.
Figure 19B:
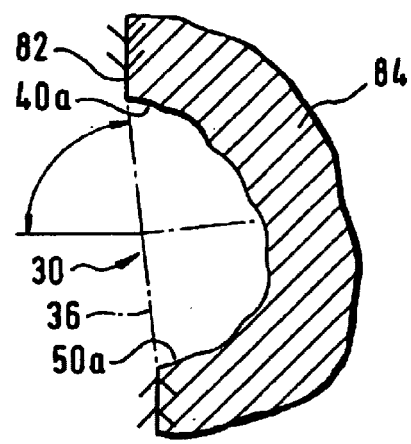
FIG. 19B is a section along the line XIX—XIX of FIG. 15.
Figure 20A:
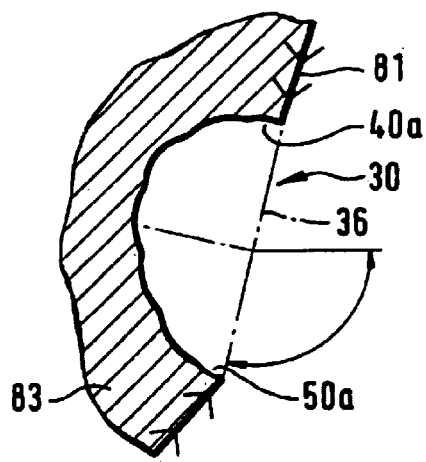
FIG. 20A is a section along the line XXA—XXA of FIG. 14.
Figure 20B:
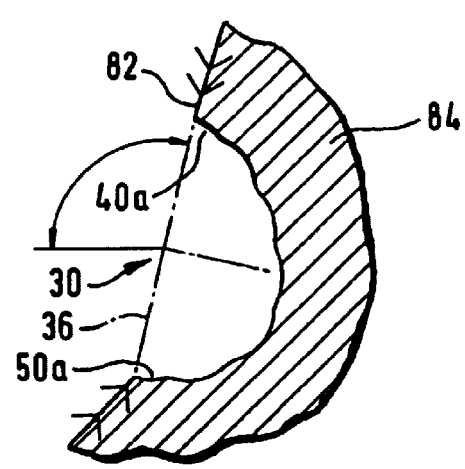
FIG. 20B is a section along the line XXB—XXB of FIG. 15.

As can be seen in, FIGS. 13 to 15, the separation surfaces are not flat or planar (two-dimensional) but a three-dimensional plane. The separation surfaces 83', 84' divide the cross-section 30 of the grip 20 always in the longitudinal center plane 36 of the raised portions 40–4, 50–55 located adjacent to the greater diameter 31 (FIG. 12). In FIGS. 16A to 20B the location of the separation planes 83', 84' is illustrated in a sequence of cross-sections 30 taken in the longitudinal direction of the grip 20 (see FIGS. 14 and 15 for their position relative to the grip 20). The depressions 20a, 20b when combined form the negative of the grip 20 and thus have longitudinal recesses 40a–45a, 50a–55a matching the raised portions 40–45 and 50–55. These recesses 40a–45a, 50a–55a thus extend spirally in the longitudinal direction of the depressions 20a, 20b of the mold halves 83, 84 whereby the separation surfaces 83', 84' are respectively positioned in the longitudinal center plane 36 of the raised portions 40, 50, respectively, the longitudinal center plane of the recesses 40a, 50a positioned adjacent to the greater diameter 31 of the cross-section 30 (see FIG. 12). Since the separation surfaces 83', 84' are thus always positioned in the longitudinal center plane 36 of the raised portions 40, 50, respectively, the recesses 40a, 50a, the separation surfaces 83', 84' are rotated in the longitudinal direction of the grip 20 or the depressions 20a, 20b in the mold halves 83, 84 according to the rotational angle R (spiral angle) of the raised portions 40–45, 50–55 of the grip 20 or the recesses 40a–45a, 50a–55a of the mold 80.

The present invention is, of course, in no way restricted to the specific disclosure of the specifications, and drawings, but also encompasses any modifications within the scope of the appended claims.

What we claim is:

1. A mold for molding a grip for a portable, hand-guided working tool; wherein the grip has a base body comprising a top grip portion extending, when the grip is mounted on the working tool, across a top side of a housing of the working tool perpendicularly to a longitudinal axis of the working tool at a spacing to the top side of the housing, wherein the base body comprises a lateral grip portion connected to the top grip portion and extending from the top grip portion, when the grip is mounted on the working tool, laterally downwardly at a spacing to a sidewall of the housing, wherein the top grip portion has a first connecting end for connecting the grip to the housing and a second connecting end for connecting the grip to the housing; said mold comprising:

a first mold half and a second mold half;

said first mold half having a first mold separation surface and said second mold half having a second mold separation surface;

said first mold half having a first depression and said second mold half having a second depression, wherein said first and second depressions combined are a negative of a grip to be molded;

wherein said negative has a first portion, having a first elliptical cross-section, for molding the top grip portion and a second portion, having a second elliptical cross-section, for molding the lateral grip portion, wherein said first and second cross-sections are identical;

said cross-sections having a first and a second diameter, said first diameter being larger than said second diameter;

said first cross-section rotated relative to said second cross-section in a circumferential direction of said negative by an angle of rotation;

said first and second depressions having integral, elongate, recesses extending in a longitudinal direction of said first and second depressions and distributed adjacent to one another in said circumferential direction of said negative;

said recesses extending spirally along said first and second portions of said negative;

said first and second mold separation surfaces positioned within a longitudinal center plane of a respective one of said recesses neighboring said first diameter and thus following said angle of rotation.

2. A mold according to claim 1, wherein said recesses have a first end at said first portion and a second end at said second portion and wherein an angular distance between said first and second ends measured in said circumferential direction of said negative is identical to said angle of rotation.

3. A mold according to claim 1, wherein said recesses have a rounded contour in said circumferential direction of said negative.

4. A mold according to claim 3, wherein said recesses have different radii of curvature.

5. A mold according to claim 3, wherein said recesses neighboring said first diameter have a smaller radius than said recesses neighboring said second diameter.

6. A mold according to claim 1, wherein said recesses in said circumferential direction are spaced at a small distance from one another.

7. A mold according to claim 1, wherein said recesses have different angular distances in said circumferential direction.

8. A mold according to claim 7, wherein said angular distance is 24° to 34°.

9. A mold according to claim 7, wherein said recesses (40a, 50a) neighboring said first diameter have a smaller angular distance than said recesses neighboring said second diameter.

10. A mold according to claim 1, wherein said respective recesses neighboring said first diameter has a flattened part extending over the length of said respective recesses.

11. A mold according to claim 10, wherein said flattened part extends to an end face of a third portion of said negative for molding the first connecting end and to an end face of a fourth portion of said negative for molding said second connecting end.

12. A mold according to claim 10, wherein said flattened part is positioned centrally relative to said respective recess.

13. A mold according to claim 10, wherein said first and second separation surfaces extends perpendicularly to said flattened part.

14. A mold according to claim 10, wherein said first and second separation surfaces extend in parallel planes.

15. A mold according to claim 1, wherein a rotational change of said first cross-section into said second cross-section is uniform in said longitudinal direction of said grip.

* * * * *

UNITED STATES PATENT AND TRADEMARK OFFICE
CERTIFICATE OF CORRECTION

PATENT NO. : 6,761,346 B1
DATED : July 13, 2004
INVENTOR(S) : Wolf et al.

It is certified that error appears in the above-identified patent and that said Letters Patent is hereby corrected as shown below:

<u>Title page,</u>
Items [54], [75] and [30], should read as follows:
 [54] -- GRIP FOR PORTABLE HAND-GUIDED WORKING TOOL AND MOLD FOR MOLDING SAME --

-- [75] Inventors: Günter Wolf, Oppenweiler (DE);
 Manfred Thaiss, Winnenden (DE) --

-- [30] Foreign Application Priority Data

Aug. 1, 1996        (DE) ............ 196 31 053 --

Signed and Sealed this

Sixteenth Day of November, 2004

JON W. DUDAS
*Director of the United States Patent and Trademark Office*